United States Patent [19]

Saxton

[11] 4,392,028
[45] Jul. 5, 1983

[54] PAY TELEPHONE WITH SANITIZED TISSUE DISPENSER

[76] Inventor: Richard L. Saxton, 4136 Brown Rd., Indianapolis, Ind. 46226

[21] Appl. No.: 232,164

[22] Filed: Feb. 6, 1981

[51] Int. Cl.³ .............................................. H04R 1/12
[52] U.S. Cl. .................................................. 179/185
[58] Field of Search .................... 179/185; 331/7 B, 2; 194/10; 179/6.3 R, 6.4, 6.5

[56] References Cited

U.S. PATENT DOCUMENTS

| | | | |
|---|---|---|---|
| 1,253,191 | 1/1918 | Bunnel | 179/185 |
| 1,297,490 | 3/1919 | Post | 179/185 |
| 1,464,455 | 8/1923 | Toppan | 179/185 |
| 1,472,530 | 10/1923 | McComas | 179/185 |
| 1,840,160 | 1/1932 | De Quesada | 179/185 |
| 2,520,417 | 8/1950 | Lewis . | |
| 2,650,269 | 8/1953 | Webb | 179/185 |
| 2,650,269 | 8/1953 | Webb . | |
| 2,700,075 | 1/1955 | Korn . | |
| 2,763,735 | 9/1956 | Wahl | 179/185 |
| 2,766,333 | 10/1956 | Bivins | 179/185 |
| 2,938,967 | 5/1960 | Guardino . | |
| 3,148,249 | 9/1964 | King . | |
| 3,323,279 | 6/1967 | Matsui | 194/2 |
| 3,530,261 | 9/1970 | Guim | 179/185 |

FOREIGN PATENT DOCUMENTS 2420292  4/1974  Fed. Rep. of Germany ...... 179/185

*Primary Examiner*—G. Z. Rubinson
*Assistant Examiner*—L. C. Schroeder
*Attorney, Agent, or Firm*—Woodward, Weikart, Emhardt & Naughton

[57] ABSTRACT

A pay telephone with sanitized tissue dispenser. A roll of individualized and interconnected sanitized tissues are rotatably mounted to a spindle. An electrical motor is operable upon deposit of a coin into a telephone to rotate the spindle dispensing a tissue through an opening in the telephone. Alternatively, the sanitized tissues are arranged in a stack held by a spring-biased carrier urging the uppermost tissue against a solenoid actuated pusher arm operable to force the uppermost tissue through the tissue-dispensing opening of the telephone.

13 Claims, 5 Drawing Figures

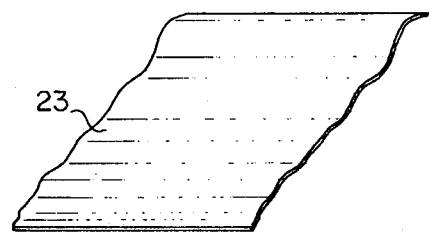
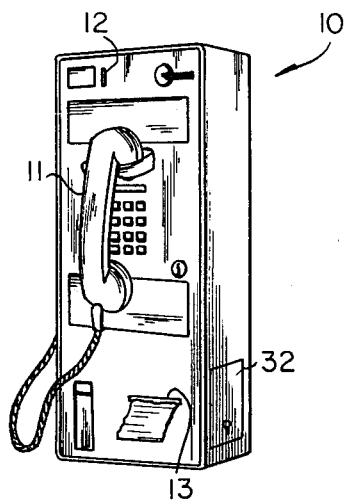
Fig. 1
Fig. 2
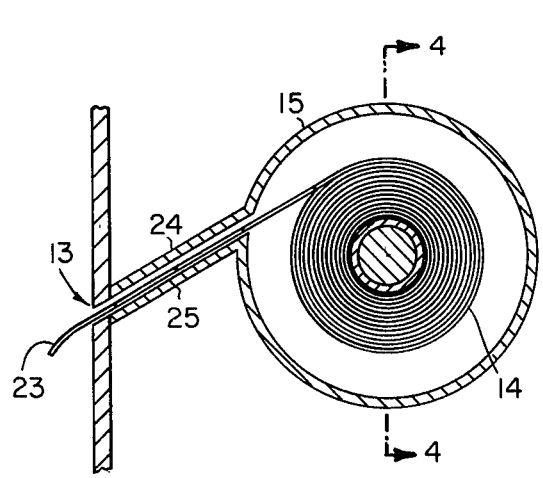
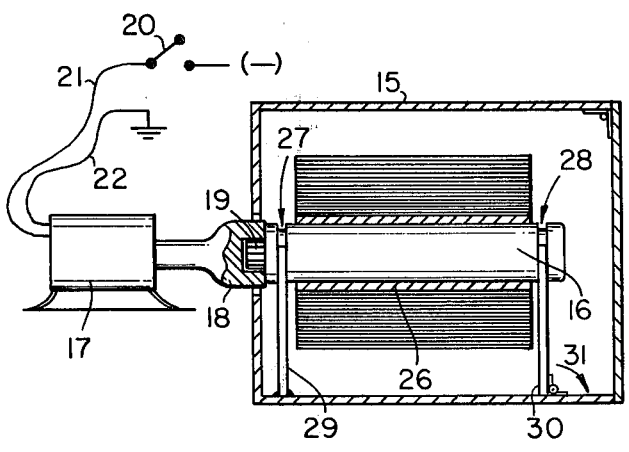
Fig. 3
Fig. 4

PAY TELEPHONE WITH SANITIZED TISSUE DISPENSER

BACKGROUND OF THE INVENTION

This invention is in the field of cleaning agents such as sanitized tissues and more specifically the dispensing of said tissues from pay telephones. It is known that telephone receivers, particularly public telephones, accumulate bacteria and other undesirable materials. The transmission of the undesirable material from one user to another user is highly likely and thus, a number of sanitary devices have been provided for use in cleaning the receiver. A typical approach is to attach a number of sanitary tissues to the telephone such as disclosed in the U.S. Pat. No. 2,650,269 issued to H. Webb. Another approach is to mount a perforated sanitary web over the telephone mouthpiece such as shown in the following U.S. Pat. Nos.: 2,520,417 issued to R. L. Lewis; 2,700,075 issued to E. P. Korn, 2,938,967 issued to R. V. Guardino; and 3,148,249 issued to J. P. King.

All of the above-listed approaches are particularly helpful and are designed primarily for residential telephone use. On the other hand, such devices are not particularly advantageous for use with public pay telephones since the sanitizers may be easily removed from the receiver. Disclosed herein is a pay telephone provided with a sanitized tissue dispenser operable to dispense a single tissue upon the receipt of a coin into the telephone. Thus, only the actual user of the telephone will be able to remove a sanitized tissue.

SUMMARY OF THE INVENTION

One embodiment of the present invention is the combination of pay telephone means including a telephone with coin-receiving means operable to issue a signal upon receipt of a coin, the pay telephone means further including a tissue-dispensing opening, a supply of sanitized tissue, storage means within the pay telephone means to receive and hold the supply of sanitized tissue, and dispensing means within the pay telephone means operably associated with the coin-receiving means and the supply of sanitized tissue and operable to force a tissue from the supply into the opening upon receipt of the signal, the dispensing means includes an electrically operated rotatable spindle, and the supply of sanitized tissue includes a roll of sanitized tissue removably mounted to the spindle.

Another embodiment of the present invention is the combination of pay telephone means including a telephone with coin-receiving means operable to issue a signal upon receipt of a coin, the pay telephone means further including a tissue-dispensing opening, a supply of sanitized tissue, storage means within the pay telephone means to receive and hold the supply of sanitized tissue, and dispensing means within the pay telephone means operably associated with the coin-receiving means and the supply of sanitized tissue and operable to force a tissue from the supply into the opening upon receipt of the signal, the supply of sanitized tissues includes a stack of individual tissues, and the dispensing means includes an electrically operated pusher arm with the dispensing means operable upon receipt of the signal to move the arm against one of the tissues in the stack moving a tissue into the opening.

It is an object of the present invention to provide new and improved sanitizers for use with a telephone.

A further object of the present invention is to provide a telephone with dispensing means for issuing telephone sanitizers.

Yet another object of the present invention is to provide a sanitized tissue dispenser combined with a pay telephone.

Related objects and advantages of the present invention will be apparent from the following description.

BRIEF DESCRIPTION OF THE DRAWINGS

FIG. 1 is a perspective view of a pay telephone incorporating the dispenser disclosed herein.

FIG. 2 is a fragmentary perspective view of an individual sanitized tissue dispensed by the telephone of FIG. 1.

FIG. 3 is an enlarged cross-sectional view of the preferred embodiment of the tissue dispenser.

FIG. 4 is a cross-sectional view taken along 4—4 of FIG. 3 and viewed in the direction of the arrows.

DESCRIPTION OF THE PREFERRED EMBODIMENTS

Figure 5:
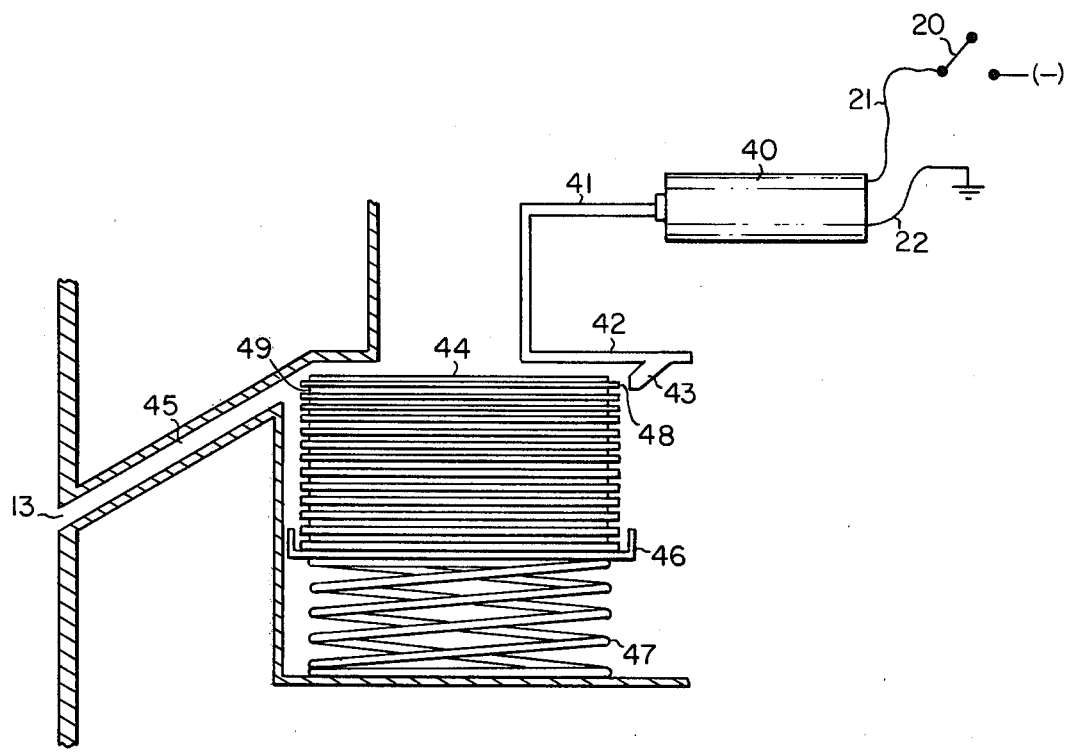
FIG. 5 is a cross-sectional view of an alternate embodiment of the tissue dispenser.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a pay telephone 10 of conventional design with the exception that the telephone has been modified to include the tissue dispenser disclosed herein. Telephone 10 includes a conventional receiver 11 with a coin-receiving means 12 operable to receive the coins required for use of the telephone.

Included within telephone 10 is a plurality of sanitized tissues dispensed from the telephone via tissue-dispensing opening 13. Many designs are contemplated and included within the present invention for issuing the supply of sanitized tissues. The preferred embodiment is shown in FIGS. 3 and 4 and includes a roll of sanitized tissues whereas an alternate embodiment shown in FIG. 5 includes a stack of individual sanitized tissues.

The preferred embodiment shown in FIGS. 3 and 4 includes a supply of sanitized tissues arranged in a roll 14 positioned within a storage means 15 which is an enclosure mounted within telephone 10.

The dispensing means for issuing the individualized tissues includes an electrically operated rotatable spindle 16 upon which the roll 14 of sanitized tissues is removably mounted. The dispensing means further includes an electrically operated motor 17 mounted within the telephone having a rotatable output shaft 18 releaseably engaged with a hexagonally shaped end 19 of spindle 16. Motor 17 is connected to a suitable source of electrical power and is operable to rotate output shaft 18 upon closing of switch 20 disposed between a source of electrical power and one wire 21 of the electrical motor with the other wire 22 connected to ground potential. The coin-receiving means 12 is operable to issue a signal upon receipt of a coin to operate motor 17.

For example, switch 20 may be positioned within coin-receiving means 12 to close upon contact with an inserted coin thereby providing a momentary closure of switch 20 activating motor 17 and deactivating the motor as the coin passes past switch 20 normally biased in the open position. Such momentary closure of switch 20 is designed to provide a suitable duration of rotation of output shaft 18 to rotate spindle 16 a sufficient amount equal to the length of a single tissue 23 issuing from the telephone.

Enclosure or storage means 15 is provided with a pair of spaced apart walls 24 and 25 forming a channel leading to opening 13 guiding the tissue sheet outwardly from the telephone. Each tissue 23 is interconnected to the adjoining tissue by means of a perforated line allowing the user to separate each tissue apart as a tissue issues from the telephone.

Other means may be provided for activating motor 17 in lieu of the coin passing over switch 20. For example, an electrically operated switch 20 may be used in lieu of the mechanically described approach. Roll 14 includes an inner cardboard cylinder 26 upon which the interconnected tissues 23 are wound in a manner similar to a roll of conventional paper towels. Cylinder 26 is removably mounted to spindle 16 in turn including a pair of grooves 27 and 28 releaseably held by a pair of wall brackets 29 and 30 mounted within enclosure 15. Bracket 30 may be hingedly mounted to the enclosure to allow pivoting of the bracket in the direction of arrow 31 to allow for insertion and removal of spindle 16 with roll 14 mounted thereon. Upon insertion of the spindle in the roll, end 19 of the spindle is inserted into the output shaft 18 with brackets 29 and 30 being positioned within grooves 27 and 28. Each bracket 29 and 30 is provided with a semi-circular groove to locatably receive the spindle. A hinged door 32 (FIG. 1) is provided on telephone 10 to allow for removal of a used roll and insertion of a fresh roll. Likewise, enclosure 15 is designed to minimize air flow over the sanitized tissue to maintain the moisture of each tissue.

The alternate embodiment of the dispensing means includes an electrically operated pusher arm positioned to force the uppermost tissue through opening 13. Such a dispensing means may include for example an electrically operated solenoid 40 having a reciprocating output rod 41 connected to push arm 42 in turn provided with a downwardly extending finger 43 designed to force the uppermost tissue 44 into channel 45 leading to opening 13 of telephone 10. Solenoid 40 is operated in a manner similar to the operation of motor 17 in that the solenoid is connected to a suitable source of electrical power with a contact 20 disposed between the source of power and wire 21 of the solenoid with the remaining wire 22 connected to ground potential. The operation of switch 20 is identical to that described for the embodiment shown in FIG. 4.

In the embodiment shown in FIG. 5, the sanitized tissues are not interconnected or mounted on a roll. Instead, the individualized tissues are arranged in a sack held by a spring-biased holder 46 with spring 47 urging holder 46 upwardly to position the uppermost tissue 44 toward and in line with finger 43 and channel 45. Due to the possibility of one tissue sticking against an adjacent tissue, it is desirable to provide separating carriers 48 positioned between each tissue. For example, carrier 48 is positioned between tissue 44 and tissue 49. Thus, finger 43 will engage not only the uppermost tissue, but also the uppermost carrier 48 and force both together into channel 45.

Many variations are contemplated and included in the present invention. For example, the tissue dispenser is shown as mounted within the main body of telephone 10. However, it is to be understood that the tissue dispenser may be provided in a separate box or container mounted adjacent the main telephone and interconnected together by means of electrical circuitry to provide a suitable command to the motor or solenoid engaged with the supply of sanitized tissue. It is anticipated that a single tissue will issue from the telephone upon deposit of the first coin into the telephone for actuation of the conventional telephone circuitry. Alternatively, a separate coin may be required for the issue of a tissue from the telephone separate and apart from the coin required for the operation of the telephone main circuitry. A further alternative is to allow the operator to issue a suitable command to the tissue dispenser, such as is the case on return of coins when making a long-distance telephone call. The sanitized tissue is disposable and is used only a single time. The tissue is moisturized and provided with a disinfectant as well as a deodorizer providing for a germ-free and scented receiver as the tissue is wiped across the receiver.

It will be obvious from the above description that the present invention provides a new and improved sanitized tissue for use with a public telephone. It will be further obvious from the above description that the present invention provides a combined pay telephone and tissue dispenser.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:
1. The combination of:
pay telephone means including a telephone with coin-receiving means operable to issue a signal upon receipt of a coin, said pay telephone means further including a tissue-dispensing opening;
a supply of sanitized tissue;
storage means within said pay telephone means to receive and hold said supply of sanitized tissue; and
dispensing means within said pay telephone means operably associated with said coin-receiving means and said supply of sanitized tissue and operable to force a tissue from said supply into said opening upon receipt of said signal, and wherein:
said dispensing means includes an electrically operated rotatable spindle; and
said supply of sanitized tissue includes a roll of sanitized tissue removably mounted to said spindle.
2. The combination of claim 1 wherein:
said roll of sanitized tissue includes a plurality of individual tissues connected together but separable upon perforated lines.
3. The combination of claim 2 wherein:
said coin-receiving means includes a switch operable to issue said signal upon a coin being deposited into said coin-receiving means.
4. The combination of claim 3 wherein:
said dispensing means includes an electrically operated motor connected to said switch;

said storage means includes an enclosure within said telephone means with brackets to releasably hold said spindle in turn releaseably engaged with said electrically operated motor.

5. The combination of claim 4 wherein:

said pay telephone means includes a channel leading from said enclosure to said opening to guide tissue from said roll.

6. The combination of:

pay telephone means including a telephone with coin-receiving means operable to issue a signal upon receipt of a coin, said pay telephone means further including a tissue-dispensing opening;

a supply of sanitized tissue;

storage means within said pay telephone means to receive and hold said supply of sanitized tissue; and dispensing means within said pay telephone means operably associated with said coin-receiving means and said supply of sanitized tissue and operable to force a tissue from said supply into said opening upon receipt of said signal, and wherein:

said supply of sanitized tissues includes a stack of individual tissues; and said dispensing means includes an electrically operated pusher arm with said dispensing means operable upon receipt of said signal to move said arm against one of said tissues in said stack moving a tissue into said opening.

7. The combination of claim 6 wherein:

said stack includes a plurality of tissues and a plurality of separating carriers positioned between and separating said tissues in said stack.

8. The combination of claim 7 wherein:

said coin-receiving means includes a switch operable to issue said signal upon a coin being deposited into said coin-receiving means.

9. The combination of claim 8 wherein:

said storage means includes a spring-biased holder supporting said stack and urging the uppermost tissue toward said pusher arm.

10. The combination of:

pay telephone means including a tissue dispensing opening and a tissue dispensing signal generator means which is operable to generate a tissue dispensing signal;

a supply of sanitized tissues;

storage means within said pay telephone means to receive and hold said supply of sanitized tissues;

dispensing means within said pay telephone means operably associated with said tissue dispensing signal generator means and said supply of sanitized tissue and operable to force a tissue from said supply into said opening upon receipt of said signal; and wherein:

said dispensing means includes an electrically operated rotatable spindle; and, said supply of sanitized tissue includes a roll of sanitized tissue removably mounted to said spindle.

11. The combination of claim 10 wherein:

said roll of sanitized tissue includes a plurality of individual tissues connected together but separable upon perforated lines.

12. The combination of:

pay telephone means including a tissue dispensing opening and a tissue dispensing signal generator means which is operable to generate a tissue dispensing signal;

a supply of sanitized tissues;

storage means within said pay telephone means to receive and hold said supply of sanitized tissues;

dispensing means within said pay telephone means operably associated with said tissue dispensing signal generator means and said supply of sanitized tissue and operable to force a tissue from said supply into said opening upon receipt of said signal;

said supply of sanitized tissues includes a stack of individual tissues; and, said dispensing means includes an electrically operated pusher arm with dispensing means operable upon receipt of said signal to move said arm against one of said tissues in said stack moving a tissue into said opening.

13. The combination of claim 12 wherein said stack includes a plurality of tissues and a plurality of separating carriers positioned between and separating said tissues in said stack.

* * * * *